United States Patent
Sharma

(10) Patent No.: US 8,916,328 B2
(45) Date of Patent: Dec. 23, 2014

(54) COATED GLASS SUBSTRATE WITH ULTRAVIOLET BLOCKING CHARACTERISTICS AND INCLUDING A RHEOLOGICAL MODIFIER

(75) Inventor: Pramod K. Sharma, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 1639 days.

(21) Appl. No.: 11/892,162

(22) Filed: Aug. 20, 2007

(65) Prior Publication Data

US 2009/0053645 A1  Feb. 26, 2009

(51) Int. Cl.
| | |
|---|---|
| *B23B 27/20* | (2006.01) |
| *B32B 27/24* | (2006.01) |
| *B05D 5/00* | (2006.01) |
| *B05D 7/00* | (2006.01) |
| *C03C 17/30* | (2006.01) |
| *C03C 17/25* | (2006.01) |

(52) U.S. Cl.
CPC .......... *C03C 17/30* (2013.01); *C03C 2218/113* (2013.01); *C03C 2217/213* (2013.01); *C03C 17/25* (2013.01)
USPC ........ 430/270.1; 428/447; 428/143; 428/220; 428/313.9; 428/403; 428/405; 427/387; 427/220; 427/515

(58) Field of Classification Search
USPC ............. 428/447, 143, 220, 313.9, 403, 405; 430/270.1; 427/387, 220, 515
See application file for complete search history.

(56) References Cited

U.S. PATENT DOCUMENTS

| | | | |
|---|---|---|---|
| 4,694,040 A * | 9/1987 | Hashimoto et al. ........... 524/765 |
| 5,902,226 A | 5/1999 | Tasaki et al. | |
| 6,120,850 A | 9/2000 | Kawazu et al. | |
| 6,214,416 B1 * | 4/2001 | Sakagami et al. ............ 427/387 |
| 2004/0126573 A1 | 7/2004 | Bier et al. | |
| 2006/0040108 A1 | 2/2006 | Wang et al. | |
| 2006/0046045 A1 | 3/2006 | Wang et al. | |
| 2007/0027232 A1* | 2/2007 | Walsh et al. .................. 523/218 |
| 2007/0064446 A1 | 3/2007 | Sharma et al. | |
| 2007/0065670 A1 | 3/2007 | Varaprasad | |
| 2007/0128449 A1 | 6/2007 | Taylor et al. | |
| 2007/0146889 A1 | 6/2007 | Wang et al. | |
| 2007/0148601 A1 | 6/2007 | Sharma et al. | |

FOREIGN PATENT DOCUMENTS

JP  60235815 A  * 11/1985

OTHER PUBLICATIONS

JP 60235815, English Ab., Nov. 1985.*
http://www.specialchem4coatings.com/tds/ucar-polyphobe-tr-115/dow-chemical/11525/index.aspx, Sep. 2010.*
XP-002504918 Database WPI Week 200281; JP 2002 275416, Sep. 25, 2002 Abstract.
U.S. Appl. No. 11/701,541, filed Feb. 2, 2007.
U.S. Appl. No. 11/716,034, filed Mar. 9, 2007.
U.S. Appl. No. 11/797,214, filed May 1, 2007.

* cited by examiner

*Primary Examiner* — Satya Sastri
(74) *Attorney, Agent, or Firm* — Nixon & Vanderhye P.C.

(57) ABSTRACT

There is provided a forming a solution by mixing at least a polymeric silane, a solvent, acetone, acetic acid, and a rheological enhancer, wherein the rheological enhancer may comprise an acrylic latex; and agitating the solution. Also provided are methods of using the same in coated articles, and coated articles themselves.

6 Claims, 1 Drawing Sheet

COATED GLASS SUBSTRATE WITH ULTRAVIOLET BLOCKING CHARACTERISTICS AND INCLUDING A RHEOLOGICAL MODIFIER

Certain example embodiments of this invention relate to a coated glass substrate having an ultraviolet (UV) blocking coating. In certain example embodiments of this invention, a UV blocking layer(s) is formed on a glass substrate, and the UV blocking layer contains a rheological modifier that enhances the viscosity of the UV blocking prior to formation into a layer. In certain exemplary embodiments, the UV blocking formulation may exhibit Newtonian behavior. In certain example instances, the overall coating is capable of blocking significant amounts of UV radiation.

BACKGROUND AND SUMMARY OF EXAMPLE EMBODIMENTS OF THE INVENTION

Glass is desirable for numerous properties and applications, including optical clarity and overall visual appearance. For some example applications, certain optical properties (e.g., light transmission, reflection and/or absorption) are desired to be optimized. For example, in certain example instances, reduction of transmission of UV (ultraviolet) radiation through glass may be desirable for storefront windows, IG window units, monolithic window units, display cases, and so forth.

Existing UV-blocking formulations based on silica may have extremely low viscosity, e.g., around 4 cp at 10 rpm. Such a low viscosity may be problematic when applying this coating by curtain coating method in which a substrate moves with a very high speed. The low viscosity may, for example, lead to a non-uniform coating thickness, problem in curing, cause of back splash, etc.

Accordingly, it will be appreciated that there is a need of a rheological modifier to enhance the viscosity of a UV-coating solution. Preferably, this modifier should be compatible with ingredients used in the UV-blocking formulations. Furthermore, the coating solution preferably behaves much like a Newtonian fluid after adding rheological modifier, preferably, e.g., at high revolutions per minute (rpm). A Newtonian fluid is a fluid that behaves similarly to water (in which the viscosity does not vary as a function of the force(s) acting upon the fluid, e.g., such as shear stress). A coating solution with high viscosity and Newtonian behavior may be desirable for at least several well-known coating processes, such as curtain coating, roller coating, dip coating, etc.

In certain aspects, this invention relates to use rheological modifier which not only compatible with the formulation but enhances the viscosity of UV-blocking coating solution. In an exemplary embodiment, the rheological modifier may be based on an acrylic latex.

In some aspects, this invention relates the enhancement in the viscosity of UV-coating solution at high shear rate or rpm. Furthermore, the Newtonian behavior at higher rpm of the UV-coating solution may be enhanced after the addition of rheological modifier.

Certain example embodiments of this invention relate, in part, to the formulation and manufacture of composition(s) containing a UV-blocking solution comprising a rheological modifier, which is preferably an acrylic latex.

These composition(s) may improve the rheological characteristics of a UV-blocking solution. These composition(s) may be used in a variety of applications, including, for example, UV-blocking coatings, optical coatings, functional coatings, and so forth. Such UV-blocking coatings may be used in applications such as for storefront windows, IG (insulating glass) window units, monolithic window units, display cases, and so forth.

Certain example embodiments relate to a method of making a rheologically enhanced ultraviolet-blocking coating solution. The method may include: forming a solution by mixing at least a polymeric silane, a solvent, acetone, acetic acid, and a rheological enhancer, wherein the rheological enhancer comprises an acrylic latex; and agitating the solution.

In certain example embodiments of this invention, there is provided a method of making a method of making a rheologically enhanced ultraviolet-blocking coating solution. The method may include: forming a solution by adding and stirring the following ingredients: a first solvent; acetone; an intermediate, wherein the intermediate was formed by serially mixing a first silane, a phenone, a triethlyamine, and a second solvent; a second silane; a color stock, wherein the color stock was formed by mixing a third solvent, acetone, a colorant, and a colloidal silica; acetic acid; water; and a rheological enhancer.

In certain example embodiments, there is provided a composition that may comprise a first solvent; acetone; an intermediate, wherein the intermediate comprises a first silane, a phenone, a triethlyamine, and a second solvent; a second silane; a color stock, wherein the color stock comprises a third solvent, acetone, a colorant, and a colloidal silica; acetic acid; water; and a rheological enhancer. The rheological enhancer may comprise an acrylic latex including high solids and a hydrophobically modified alkali-soluble emulsion. The composition may be used in making UV-blocking coatings.

In certain example embodiments, there is a coated article including a glass substrate; and an ultraviolet-blocking film provided on the glass substrate; wherein the film comprises a rheological enhancer for improving the rheological properties of a composition that forms a precursor to the film, wherein the rheological enhancer comprises an acrylic latex. The coated article may be a coated glass substrate used in an IG window unit, a monolithic window unit, a display case, and/or the like.

DETAILED DESCRIPTION OF EXAMPLE EMBODIMENTS OF THE INVENTION

Figure 1:
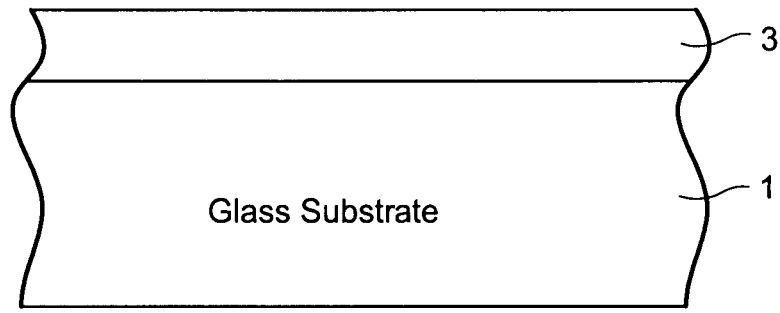
FIG. 1 is a cross-sectional view of a coated article including a UV blocking coating in accordance with an example embodiment of this invention.

Referring now more particularly to the accompanying drawings in which like reference numerals indicate like parts throughout the several views.

This invention relates to a composition comprising a rheological enhancer that may be used in an UV-blocking coatings or other suitable coating applications. The UV-blocking coatings may be used on glass substrates in applications such as in IG window units, monolithic window units, display cases, and so forth. For example UV-blocking coatings 3 described herein may be used as the UV-blocking coating(s) in any of U.S. Patent App. Pub. Nos. 2007/0128449, 2006/0040108, or 2007/0148601, all of which are hereby incorporated herein by reference.

FIG. 1 is a cross sectional view of a coated article according to an example embodiment of this invention. The coated article of FIG. 1 includes a glass substrate 1 and a UV-blocking coating 3 comprising a rheologically enhanced formulation. It is also possible to form other layer(s) between substrate 1 and coating 3, and/or over coating 3, in different example embodiments of this invention.

In the FIG. 1 embodiment, the UV-blocking coating 3 includes a suitable UV-blocking composition. The coating may include, for example, at least one silane. The composition may contain at least one adjuvant to increase the hardness, durability, transmissivity, and/or other properties of the coating 3. The coating 3 may be any suitable thickness in certain example embodiments of this invention.

Optionally, the coating 3 may also include an overcoat of or including material such as silicon oxide (e.g., $SiO_2$), or the like, which may be provided over the UV-blocking coating 3 in certain example embodiments of this invention. The overcoat layer may be deposited over coating 3 in any suitable manner. For example, a Si or SiAl target could be sputtered in an oxygen and argon atmosphere to sputter-deposit the silicon oxide inclusive layer. Alternatively, the silicon oxide inclusive layer could be deposited by flame pyrolysis, or any other suitable technique such as spraying, roll coating, printing, via silica precursor sol-gel solution (then drying and curing), coating with a silica dispersion of nano or colloidal particles, vapor phase deposition, and so forth. It is noted that it is possible to form other layer(s) over an overcoat layer in certain example instances. It is noted that layer 3 may be doped with other materials such as titanium, aluminum, nitrogen or the like. Other layer(s) may also be provided on the glass substrate 1.

Set forth below is a description of how a composition forming a component of the UV-blocking coating 3 may be made according to certain example non-limiting embodiments of this invention.

Exemplary embodiments of this invention provide a method of making a coating solution containing a rheologically enhanced composition for use in coating 3. In certain example embodiments of this invention, the coating solution may be based on a composition comprising a polymeric solution including or consisting essentially of silica chains.

In making the polymeric silica solution for the silica sol, a silane may be mixed with a catalyst, solvent and water. After agitating, the polymeric silica solution may be mixed with a colloidal silica solution, optionally with a solvent.

The coating solution may be then deposited on a suitable substrate such as a highly transmissive clear glass substrate 1, directly or indirectly. Then, the coating solution on the glass 1 substrate is cured and/or fired, preferably from about 100 to 750° C., and all subranges therebetween, thereby forming the UV-blocking coating 3 on the glass substrate 1. In certain example embodiments, the coating 3 may have a thickness ranging from 10 to 200 nm, preferably from 50 to 110, and even more preferably from 175 to 185 nm.

In an exemplary embodiment, the process used in forming coating 3 may comprise: forming a UV-coating solution; mixing a rheological enhancer with the UV-coating solution; casting the mixture to form a coating on a glass substrate; and curing and heat treating the coating. Preferably, the rheological modifier comprises less than 10 wt % of the mixture, and all subranges thereunder; more preferably less than 5 wt % of the mixture, and all subranges thereunder; more preferably, between 0.5% and 2.5% of the mixture, and all subranges therebetween; and more preferably between 1 and 2% of the mixture, and all subranges therebetween.

Suitable rheological enhancers may include, for example, an acrylic latex, such as one available under the tradename UCAR POLYPHOBE TR-115 available from Union Carbide Corp. The acrylic latex may comprise high solids and hydrophobically modified alkali-soluble emulsion (HASE). Other rheological enhancers may also be used, such as polyvinyl alcohols, cellulose, polyvinylbutyrals, resins or any high molecular weight polymers such as styrenes or acrylates, etc., and preferably those rheological enhancers that do not substantially affect the primarily Newtonian nature of the system.

The curing may occur at a temperature between 100 and 150° C. for up to 2 minutes, and the heat treating may occur at a temperature between 600 and 750° C. for up to 5 minutes. Shorter and longer times with higher and lower temperatures are contemplated within exemplary embodiments of the present invention.

In accordance with an exemplary embodiment of the present invention, the ingredients were added in the order listed then stirred for about 6 hours so as to form a UV-coating solution.

In the following examples, "color stock" is a solution made by mixing the following ingredients for 30 minutes: 1.5 g of n-propanol, 0.75 g of acetone, 0.0084 g of colorant Savinyl Blue GLS Powder (from Clariant), 0.0063 of colorant Savinyl Pink 6 BLS Powder (from Clariant), and 23.1 g of IPA-ST (from Nissan).

In the following examples, "intermediate" is a solution made by the following procedure: 21.14 wt % of 3-glycidoxypropyltrimethoxysilane (from United Chemical Technology) was heated to a temperature of 175° F. During heating when temperature reached to 140° F., 5.50 wt % 2,2,4,4, tetrahydroxybenzophenone (from Norquay Technology, NY) was added. Once liquid reaches to 175° F. make, wait until the 2,2,4,4 tetrahydroxybenzophenone dissolves completely. 0.026 wt % of triethylamine (from ChemCentral) was added, and the solution was mixed for another 2 hours. The solution was cooled to room temperature and diluted by 73.32 wt % n-propanol (Dow Chemical). The solution was stirred for 30 minutes.

TABLE 1

Formulation of UV-blocking coating solution

| Ingredient | Amount (g) |
| --- | --- |
| n-Propanol | 32.06 |
| n-Butanol | 12.82 |
| Acetone | 19.42 |
| Intermediate | 51.06 |
| Phenyl triethoxysilane | 0.61 |
| Methyl triethoxysilane | 0.55 |
| Tetraethoxysilane | 1.20 |
| Color Stock | 25.38 |
| Acetic Acid | 0.49 |
| Water | 6.40 |

Suitable solvents may include, for example, n-butanol, n-propanol, isopropanol, other well-known alcohols (e.g., ethanol), and other well-known organic solvents (e.g., toluene).

The following examples of different embodiments of this invention are provided for purposes of example and understanding only, and are not intended to be limiting unless expressly claimed.

EXAMPLE #1

The formulation of UV-coating solution is prepared using ingredients given in the Table 1. This formulation does not contain any rheological modifier. The viscosity of this coating solution was measured by Brookfield DV-II+ viscometer at various revolutions per minutes (rpm). Table 2 indicates the viscosity in unit of (cp) at different rpm at 25° C. The viscosity at 10 rpm and 100 rpm is 4.98 cp and 2.12 cp, respectively.

EXAMPLE #2

In Example #2, 99 wt % of UV-coating solution was mixed with 1 wt % of rheological modifier. The rheological modifier used in this example is acrylic latex (also available commercially, trade name UCAR POLYPHOBE TR-115 from Union Carbide Corporation, USA). This rheological modifier has high solids and hydrophobically modified alkali soluble emulsion (HASE). The solution was stirred for 5 minutes. The viscosity of this coating solution was measured by Brookfield DV-II+ viscometer at various revolutions per minutes (rpm). Table 2 indicates the viscosity in cp at different rpm at 25° C. The viscosity at 10 rpm and 100 rpm is 72.6 cp and 64.4 cp, respectively.

EXAMPLE #3

In Example #2, 98.5 wt % of UV-coating solution was mixed with 1.5 wt % of rheological modifier. The solution was stirred for 5 minutes. The viscosity of this coating solution was measured by Brookfield DV-II+ viscometer at various revolutions per minutes (rpm). Table 2 indicates the viscosity in cp at different rpm at 25° C. The viscosity at 10 rpm and 100 rpm is 144 cp and 121.5 cp, respectively.

EXAMPLE #4

In Example #2, 98 wt % of UV-coating solution was mixed with 2 wt % of rheological modifier. The solution was stirred for 5 minutes. The viscosity of this coating solution was measured by Brookfield DV-II+ viscometer at various revolutions per minutes (rpm). Table 2 indicates the viscosity in cp at different rpm at 25° C. The viscosity at 10 rpm and 100 rpm is 225.8 cp and 196.2 cp, respectively.

EXAMPLE #5

In Example #2, 97.5 wt % of UV-coating solution was mixed with 2.5 wt % of rheological modifier. The solution was stirred for 5 minutes. The viscosity of this coating solution was measured by Brookfield DV-II+ viscometer at various revolutions per minutes (rpm). Table 2 indicates the viscosity in cp at different rpm at 25° C. The viscosity at 10 rpm and 100 rpm is 338.9 cp and 278.4 cp, respectively.

TABLE 2

| Wt % of UV-coating solution and rheological modifier | | |
|---|---|---|
| Example No. | Wt % of UV-Coating Solution | Wt % of Rheological Modifier |
| 1 | 100 | 0 |
| 2 | 99 | 1 |
| 3 | 98.5 | 1.5 |
| 4 | 98 | 2 |
| 5 | 97.5 | 2.5 |

TABLE 3

| Viscosity vs. RPM | | | | | |
|---|---|---|---|---|---|
| RPM | Example #1 | Example #2 | Example #3 | Example #4 | Example #5 |
| 10 | 4.98 cp | 72.6 cp | 144 cp | 225.8 cp | 338.9 cp |
| 20 | 3.21 cp | 71.8 cp | 137.4 cp | 228 cp | 335.9 cp |
| 50 | 2.21 cp | 68 cp | 124.2 cp | 208.8 cp | 308.9 cp |
| 75 | 2.14 cp | 65.7 cp | 120.8 cp | 198.4 cp | 289.7 cp |
| 100 | 2.12 cp | 64.4 cp | 121.5 cp | 195.2 cp | 278.4 cp |

Figure 2:
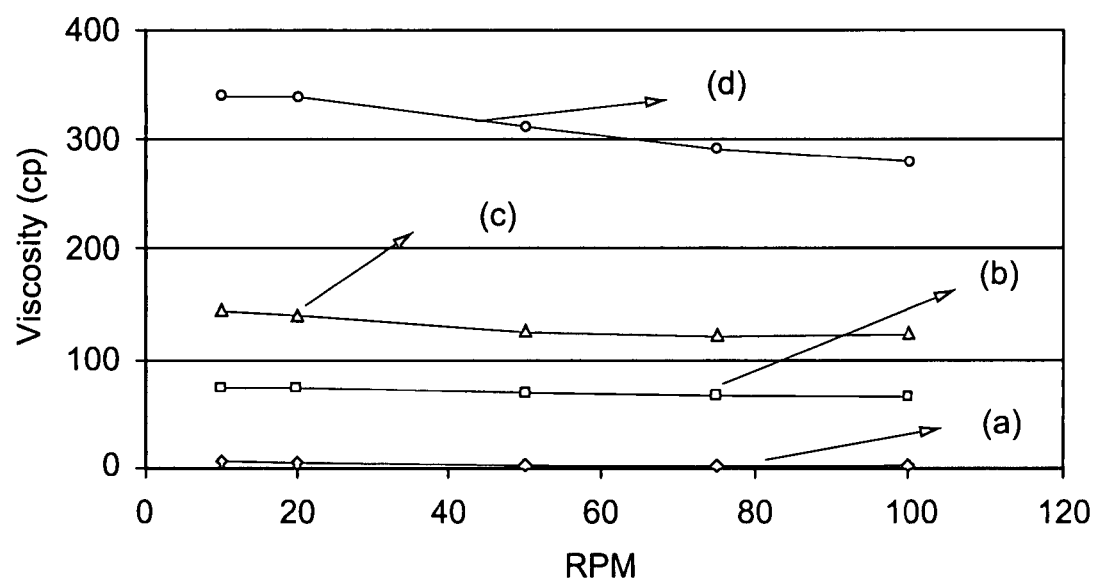
FIG. 2 shows a chart illustrating the viscosity of certain exemplary embodiments of compositions as a function of rpm.

FIG. 2 shows viscosity of the exemplary coating solutions with different wt % of rheological modifier. Series (a) corresponds with Example #1; series (b) with #2; series (c) with Example #3; and series (d) with Example #5.

As will be appreciated, the addition of a rheological modifier enhances the viscosity from 4.98 cp to the maximum of approximately 340 cp at 10 rpm with only an addition of 2.5 wt %. At high rpm such as 100 rpm, the viscosity increases from 2.12 cp to approximately 279 cp.

In accordance with certain exemplary embodiments, the viscosity of the solution at 25° C. is preferably between 50 and 350 cp (and all subranges therebetween), and more preferably between 60 and 225 cp (and all subranges therebetween).

As a person of ordinary skill will appreciate, the coating solution of Example #1 has stability in pH<3.9. Accordingly, a suitable rheological modifier may be compatible in this pH range.

The formulation with 2.5 wt % rheological modifier may not significantly age for 20 days.

The viscosity of the original coating solution (Example #1) does not significantly change from 20 rpm to 100 rpm, which is a Newtonian behavior of liquid. Thus, the rheological modifier used in this disclosure may enhance the viscosity of the original coating solution at any given rpm without significantly changing the solution's viscosity much at rpm ranging from 50 to 100 rpm. The coating solution thus may retain its primarily Newtonian characteristics at high rpm. It should be noted that the coating solution may exhibit some degree of non-Newtonian properties.

All numerical ranges and amounts are approximate and include at least some variation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of making a coated article using a rheologically enhanced ultraviolet-blocking coating solution, the method comprising:
    forming a solution by adding and stirring the following ingredients: a first solvent; acetone; an intermediate, wherein the intermediate was formed by serially mixing a first silane, a phenone, a triethylamine, and a second solvent; a second silane; a color stock, wherein the color stock was formed by mixing a third solvent, acetone, a colorant, and a colloidal silica; acetic acid; water; and a rheological enhancer, wherein the overall solution has a pH of less than 3.9; and
    using the solution in forming a coating on a substrate.

2. The method of claim 1, wherein the rheological enhancer comprises less than 10 wt % of the solution, and wherein the solution is substantially a Newtonian fluid.

3. The method of claim 1, wherein the rheological enhancer comprises less than 5 wt % of the solution, and wherein the solution is substantially a Newtonian fluid.

4. The method of claim 1 wherein the rheological enhancer comprises between 1 and 2 wt % of the solution, and wherein the solution is substantially a Newtonian fluid.

5. The method of claim 1, wherein the rheological enhancer comprises an acrylic latex.

6. The method of claim 1, wherein the solution has a viscosity at 25° C. ranging between 50 and 350 cp.

\* \* \* \* \*